US009445229B2

(12) United States Patent
Kurokawa et al.

(10) Patent No.: US 9,445,229 B2
(45) Date of Patent: Sep. 13, 2016

(54) ESTIMATION OF SIGNIFICANT PLACES VISITED BY MOBILE-TERMINAL USER BASED ON COMMUNICATIONS LOG TO BASE STATIONS

(75) Inventors: Mori Kurokawa, Saitama (JP); Daisuke Kamisaka, Saitama (JP)

(73) Assignee: KIDDI CORPORATION, Tokyo (JP)

( * ) Notice: Subject to any disclaimer, the term of this patent is extended or adjusted under 35 U.S.C. 154(b) by 984 days.

(21) Appl. No.: 13/270,741

(22) Filed: Oct. 11, 2011

(65) Prior Publication Data
US 2012/0088525 A1     Apr. 12, 2012

(30) Foreign Application Priority Data

Oct. 12, 2010 (JP) ................................. 2010-229473

(51) Int. Cl.
H04W 4/02 (2009.01)
(52) U.S. Cl.
CPC ............ *H04W 4/021* (2013.01); *H04W 4/028* (2013.01)
(58) Field of Classification Search
CPC .... H04L 67/22; H04L 67/306; H04W 48/04; H04W 4/025; H04W 4/028; H04W 4/021; H04W 28/18; H04W 64/00
USPC ...................................... 455/456.5
See application file for complete search history.

(56) References Cited

U.S. PATENT DOCUMENTS

2010/0114901 A1* 5/2010 Rhee et al. .................. 707/741

FOREIGN PATENT DOCUMENTS

| EP | 2 416 549 A1 | 2/2012 |
|---|---|---|
| JP | A-2006-23793 | 1/2006 |
| JP | A-2006-65870 | 3/2006 |
| JP | A-2006-163996 | 6/2006 |
| JP | A-2010-49295 | 3/2010 |
| JP | A-2010-226297 | 10/2010 |
| WO | WO 2010/113699 A1 | 10/2010 |

OTHER PUBLICATIONS

Nurmi et al. (Identifying Meaningful Places: the Non-parametric Way).*
Oyama et al. (Research on Method of Sharing Location Information for Group with Privacy Protection).*

(Continued)

*Primary Examiner* — George Eng
*Assistant Examiner* — Jing Gao
(74) *Attorney, Agent, or Firm* — Oliff PLC

(57) ABSTRACT

A method is disclosed of estimating significant places visited by a mobile-terminal user for wireless communication via base stations. The method includes: collecting at least one communication log represented with consecutive communication events between the mobile terminal and connected one of the base stations in a coverage area of each mobile terminal, the base stations being identified by unique base-station identifiers (BS IDs), respectively, each communication event including date and time of communication and one of the BS IDs which is indicative of the connected base station; dividing each communication log into consecutive time-windowed segments, using a discrete time window moving in time; and, per each time-windowed segment, estimating at least one significant place visited by the user, based on a probability distribution with which the BS IDs appear in each time-windowed segment.

13 Claims, 18 Drawing Sheets

(56) References Cited

OTHER PUBLICATIONS

Oyama et al., "Research on method of sharing location information for group with privacy protection," 2008, pp. 97-102 (with abstract).

Kudoh et al., "Time/Date Category Driven Method with Entropy for Destination Prediction", 2004, pp. 551-560 (with abstract).

Office Action issued in Japanese Application No. 2010-229473 issued Feb. 10, 2014 (with translation).

Toyama et al.; "Using a Positioning System of Cellular Phone to Learn Significant Locations;" *Information Processing Association*; 2005; pp. 2915-2924; vol. 46, No. 12.

Nurmi et al.; "Identifying Meaningful Places: The Non-parametric Way;" *Pervasive 2008, LNCS 503*; 2008; pp. 111-127.

* cited by examiner

| COMMUNICATION LOG ||  |
|---|---|---|
| DATE AND TIME || BS ID |
| 2010/6/15 | 18:05:21 | BS 1 |
| 2010/6/15 | 18:11:58 | BS 1 |
| 2010/6/15 | 18:15:03 | BS 2 |
| 2010/6/15 | 18:17:11 | BS 1 |
| 2010/6/15 | 18:20:32 | BS 2 |
| 2010/6/15 | 18:22:42 | BS 1 |
| 2010/6/15 | 18:42:19 | BS 2 |
| 2010/6/15 | 19:17:23 | BS 3 |
| 2010/6/15 | 19:29:11 | BS 4 |
| 2010/6/15 | 19:32:15 | BS 4 |
| 2010/6/15 | 19:44:10 | BS 5 |
| 2010/6/15 | 20:08:05 | BS 6 |
| 2010/6/15 | 20:12:52 | BS 6 |
| 2010/6/15 | 20:14:24 | BS 7 |
| 2010/6/15 | 20:17:09 | BS 7 |
| 2010/6/15 | 20:23:22 | BS 6 |
| 2010/6/15 | 20:41:50 | BS 7 |
| 2010/6/15 | 20:48:30 | BS 6 |
| 2010/6/15 | 20:52:43 | BS 6 |

FIG.6

TIME-WINDOWED SEGMENTS OF COMMUNICATION LOG

| TIME-WINDOWED SEGMENT | START TIME | END TIME |
|---|---|---|
| 1 | 2010/6/15  18:00:00 | 2010/6/15  18:59:59 |
| 2 | 2010/6/15  18:15:00 | 2010/6/15  19:14:59 |
| 3 | 2010/6/15  18:30:00 | 2010/6/15  19:29:59 |
| 4 | 2010/6/15  18:45:00 | 2010/6/15  19:44:59 |
| 5 | 2010/6/15  19:00:00 | 2010/6/15  19:59:59 |
| 6 | 2010/6/15  19:15:00 | 2010/6/15  20:14:59 |
| 7 | 2010/6/15  19:30:00 | 2010/6/15  20:29:59 |
| 8 | 2010/6/15  19:45:00 | 2010/6/15  20:44:59 |
| 9 | 2010/6/15  20:00:00 | 2010/6/15  20:59:59 |

FIG.7

FREQUENCIES OF BS IDS WITHIN EACH TIME-WINDOWED SEGMENT

| TIME-WINDOWED SEGMENT | BS 1 | BS 2 | BS 3 | BS 4 | BS 5 | BS 6 | BS 7 |
|---|---|---|---|---|---|---|---|
| 1 | 4 | 3 | 0 | 0 | 0 | 0 | 0 |
| 2 | 2 | 3 | 0 | 0 | 0 | 0 | 0 |
| 3 | 0 | 1 | 1 | 1 | 0 | 0 | 0 |
| 4 | 0 | 0 | 1 | 2 | 0 | 0 | 0 |
| 5 | 0 | 0 | 1 | 2 | 1 | 0 | 0 |
| 6 | 0 | 0 | 1 | 2 | 1 | 2 | 1 |
| 7 | 0 | 0 | 0 | 1 | 1 | 3 | 2 |
| 8 | 0 | 0 | 0 | 0 | 0 | 3 | 3 |
| 9 | 0 | 0 | 0 | 0 | 0 | 5 | 3 |

FIG.8

LATENT TOPICS BASED ON FREQUENCIES OF BS IDS WITHIN EACH TIME-WINDOWED SEGMENT

| TIME-WINDOWED SEGMENT | LATENT TOPIC | BS 1 | BS 2 | BS 3 | BS 4 | BS 5 | BS 6 | BS 7 |
|---|---|---|---|---|---|---|---|---|
| 1 | STAYING A | 4 | 3 | 0 | 0 | 0 | 0 | 0 |
| 2 | STAYING A | 2 | 3 | 0 | 0 | 0 | 0 | 0 |
| 3 | STAYING A + MOVING | 0 | 1 | 1 | 1 | 0 | 0 | 0 |
| 4 | MOVING | 0 | 0 | 1 | 2 | 0 | 0 | 0 |
| 5 | MOVING | 0 | 0 | 1 | 2 | 1 | 0 | 0 |
| 6 | MOVING + STAYING B | 0 | 0 | 0 | 2 | 1 | 2 | 1 |
| 7 | MOVING + STAYING B | 0 | 0 | 0 | 1 | 1 | 3 | 2 |
| 8 | STAYING B | 0 | 0 | 0 | 0 | 0 | 3 | 3 |
| 9 | STAYING B | 0 | 0 | 0 | 0 | 0 | 5 | 3 |

FIG.9

POSTERIOR PROBABILITIES THAT EACH COMMUNICATION EVENT
BELONGS TO CLUSTERS PER EACH TIME-WINDOWED SEGMENT

| TIME-WINDOWED SEGMENT | CLUSTER 1 | CLUSTER 2 | CLUSTER 3 |
|---|---|---|---|
| 1 | 0.99 | 0.00 | 0.01 |
| 2 | 0.98 | 0.00 | 0.02 |
| 3 | 0.10 | 0.00 | 0.90 |
| 4 | 0.01 | 0.01 | 0.98 |
| 5 | 0.01 | 0.03 | 0.96 |
| 6 | 0.00 | 0.15 | 0.85 |
| 7 | 0.00 | 0.80 | 0.20 |
| 8 | 0.00 | 0.98 | 0.02 |
| 9 | 0.00 | 0.97 | 0.03 |

FIG.10

RESULTS OF CLUSTERING

| CLUSTER ID | BS 1 | BS 2 | BS 3 | BS 4 | BS 5 | BS 6 | BS 7 |
|---|---|---|---|---|---|---|---|
| CLUSTER 1 | 0.49 | 0.49 | 0.01 | 0.01 | 0.00 | 0.00 | 0.00 |
| CLUSTER 2 | 0.00 | 0.00 | 0.01 | 0.06 | 0.05 | 0.51 | 0.37 |
| CLUSTER 3 | 0.00 | 0.06 | 0.21 | 0.38 | 0.21 | 0.14 | 0.08 |

FIG.11

RESULTS OF ENTROPY-BASED DETERMINATION
AS TO WHETHER USER IS "STAYING"

| CLUSTER ID | ENTROPY | STAYING/MOVING |
|---|---|---|
| CLUSTER 1 | 0.34 | STAYING |
| CLUSTER 2 | 0.47 | STAYING |
| CLUSTER 3 | 0.69 | MOVING |

FIG.12

ORIGINAL LOCATIONS OF BASE STATIONS

| BS ID | LATITUDE | LONGITUDE |
|---|---|---|
| BS 1 | 34.5 | 135.2 |
| BS 2 | 34.5 | 135.4 |
| BS 3 | 35.0 | 135.6 |
| BS 4 | 35.4 | 135.5 |
| BS 5 | 35.7 | 136.1 |
| BS 6 | 36.2 | 136.3 |
| BS 7 | 36.3 | 136.5 |

FIG.13

CORRECTED LOCATIONS OF BASE STATIONS

| BS ID(j) | xj | yj |
|---|---|---|
| BS 1 | −54.5 | −100.2 |
| BS 2 | −36.3 | −100.2 |
| BS 3 | −18.2 | −44.5 |
| BS 4 | −27.2 | 0.0 |
| BS 5 | 27.2 | 33.4 |
| BS 6 | 45.4 | 89.0 |
| BS 7 | 63.6 | 100.2 |

FIG.14

EXPECTED VALUES OF NUMBERS WITH WHICH MOBILE PHONE
COMMUNICATES WITH BASE STATIONS PER EACH CLUSTER

| CLUSTER ID | BS 1 | BS 2 | BS 3 | BS 4 | BS 5 | BS 6 | BS 7 |
|---|---|---|---|---|---|---|---|
| CLUSTER 1 | 5.92 | 6.01 | 0.12 | 0.14 | 0.01 | 0.00 | 0.00 |
| CLUSTER 2 | 0.00 | 0.00 | 0.19 | 1.18 | 0.98 | 10.49 | 7.60 |
| CLUSTER 3 | 0.08 | 0.99 | 3.69 | 6.68 | 2.01 | 2.51 | 1.40 |

FIG.15

RESULTS OF VARIANCE-BASED DETERMINATION
AS TO WHETHER USER IS "STAYING"

| CLUSTER ID | MAXIMUM EIGENVALUES OF VARIANCE-COVARIANCE MATRICES | STAYING/MOVING |
|---|---|---|
| CLUSTER 1 | 178.83 | STAYING |
| CLUSTER 2 | 1238.86 | STAYING |
| CLUSTER 3 | 3974.56 | MOVING |

FIG.16

ESTIMATION OF USER'S SIGNIFICANT PLACES

| CLUSTER ID | FREQUENCIES WITH WHICH COMMUNICATIONS TO BASE STATIONS WERE MADE ON WEEKDAYS | FREQUENCIES WITH WHICH COMMUNICATIONS TO BASE STATIONS WERE MADE ON HOLIDAYS | TOTAL FREQUENCIES WITH WHICH COMMUNICATIONS TO BASE STATIONS WERE MADE | FREQUENCY RATES AT WHICH COMMUNICATIONS TO BASE STATIONS WERE MADE ON HOLIDAYS | SIGNIFICANT PLACES |
|---|---|---|---|---|---|
| CLUSTER 1 | 36 | 4 | 40 | 10.00% | OFFICE |
| CLUSTER 2 | 12 | 24 | 36 | 66.67% | HOME |
| CLUSTER 4 | 8 | 4 | 12 | 33.33% | MOVING |
| CLUSTER 5 | 0 | 8 | 8 | 100.00% | MOVING |

FIG.17

STORED DATA OF SIGNIFICANT PLACES

| CLUSTER ID | BS ID | POSTERIOR PROBABILITIES | LATITUDE | LONGITUDE | LABELS OF SIGNIFICANT PLACES |
|---|---|---|---|---|---|
| CLUSTER 2 | BS 6 | 0.51 | 36.2 | 136.3 | OFFICE |
| CLUSTER 2 | BS 7 | 0.37 | 36.3 | 136.5 | OFFICE |
| CLUSTER 2 | BS 4 | 0.06 | 35.4 | 135.5 | OFFICE |
| CLUSTER 1 | BS 1 | 0.49 | 34.5 | 135.2 | HOME |
| CLUSTER 1 | BS 2 | 0.49 | 34.5 | 135.4 | HOME |
| CLUSTER 4 | BS 8 | 0.99 | 35.5 | 134.1 | MOVING |
| CLUSTER 5 | BS 9 | 0.98 | 35.1 | 134.6 | MOVING |

FIG.18

ESTIMATION OF SIGNIFICANT PLACES VISITED BY MOBILE-TERMINAL USER BASED ON COMMUNICATIONS LOG TO BASE STATIONS

CROSS-REFERENCE TO RELATED APPLICATIONS

This application claims the priority benefit of Japanese Patent Application No. 2010-229473, filed Oct. 12, 2010, the content of which is incorporated herein by reference in its entirety.

BACKGROUND OF THE INVENTION

1. Field of the Invention

The invention relates generally to techniques of estimating significant or meaningful places or regions visited by a user who carries a mobile communication device while traveling.

2. Description of the Related Art

In recent years, it has been popular to incorporate a positioning function such as a GPS (Global Positioning System) into a mobile terminal represented by a mobile phone. In such a situation, a user of such a mobile terminal can measure the user's current position using the mobile terminal, and can transmit the measured position to a server via a network, allowing the user to be provided with various types of location-based services or applications.

A technique is known in which a user's geographical locations are measured at the user's mobile terminal through its GPS, the measured locations are sent from the mobile terminal to a server, the server is operated to calculate geographical regions visited by the user, based on the user's location history represented with the location data, and a service or a set of information tailored to the calculated geographical regions is offered from the server to the user, as disclosed in, for example, Patent Document No. 1 listed below.

This technique allows clustering of the user's locations measured by the user's mobile terminal, based on the distances between the user's locations.

This technique can geographically measure places visited by a mobile-terminal user, but cannot measure or estimate the implications of each place visited (i.e., whether or not each place is significant or meaningful to the user). In this technique, a server can provide the user with a service or a set of information tailored to the place where the user is located, but a desired service or a desired set of information to be provided to the user varies depending on the implication or significance of the user's place (whether the place is significant).

In an example, when the user stays at a particular place for a long time, a desirable service or information to be provided with the user can be completely different between when the place is the user's home and when the place is the user's office. Typically, implications of a place which is visited by a user and is measured using the GPS are measured using information instructed by the user, or using information previously stored in association with the user.

An alternative technique is also known of estimating a user's significant places at the user's mobile terminal, by learning technology, based on a history of the user's locations measured at the user's mobile terminal through its GPS technology, as disclosed in, for example, Non-Patent Document No. 1 listed below. This technique requires measurement of location data using the GPS technology at regular time intervals.

A still alternative technique is also known of estimating a user's significant places using a mixed Gaussian. Mixture Model (distribution), at the user's mobile terminal, by learning technology, based on a history of the user's locations measured at the user's mobile terminal through its GPS, as disclosed in, for example, Non-Patent Document No. 2 listed below.

LIST OF PATENT DOCUMENTS

1. JP2010-49295

LIST OF NON-PATENT DOCUMENTS

1. "Using a Positioning System of Cellular Phone to Learn Significant Locations," co-authored by Norio Toyama, Takashi Hattori and Tatsuya Hagino, Information Processing Association, Vol. 46, No. 12, pp. 2915-2924, 2005, and
2. "Identifying Meaningful Places: The Non-parametric Way," co-authored by Petteri Nurmi and Sourav Bhattacharya, Pervasive 2008, LNCS 5013, pp. 111-127, 2008.

BRIEF SUMMARY OF THE INVENTION

For collecting a user's location data indicative of the user's location history, the above-described user's significant-place estimation essentially requires a positioning function such as a GPS and an associated application built in a mobile terminal carried or worn by the user.

Due to activation of the positioning function and the associated application in the user's mobile terminal continuously or at regular time intervals, the mobile terminal, however, suffers not only a shortened battery-life of the mobile terminal, but also an increased quantity of data packets sent from the mobile terminal. This can discourage wider use of services offered to users based on locations significant in the users' daily activities.

The conventional techniques described above have drawbacks. More specifically, the technique disclosed in Non-Patent Document No. 1 requires measurement of a user's locations at constant time intervals, because this technique estimates a place visited by the user's status (staying or moving), based on a calculation of a distance that the mobile terminal moved for a constant period of time, that is, a velocity at which the mobile terminal moved. When the actual time intervals between location measurements are not constant, if each actual time interval is too short for the user's actual movement path to adequately approximate a linear movement path, the calculated velocity of the mobile terminal can have a substantial amount of error from the actual velocity. This results in lowered accuracy of the estimation of the user's status or the place visited by the user.

The technique disclosed in Non-Patent Document No. 2, which allows a user's significant places to be estimated using a mixed Gaussian Mixture Model (distribution), based on the user's location history, essentially tends to suffer undesirable clustering of remote locations into a single location, due to the nature of parameter estimation using the mixed Gaussian Mixture Model, if the location history is constituted by locations having coarse spatial granularity (i.e., a considerably long distance is left between adjacent ones of the locations). This also results in lowered accuracy of the estimation of the user's status or the place visited by the user.

These techniques allow a user's significant place to be estimated using location data obtained by activating a GPS in the user's mobile terminal. The GPS tends to consume a large amount of electrical power and tends to shorten a battery life of the mobile terminal.

In view of the foregoing, it would be desirable to estimate a user's significant place without relying on a GPS in the user's mobile terminal.

It is noted that the technique disclosed in Patent Document No. 1 allows a user's location history to be estimated based on a sequence of connected ones of a plurality of base stations which are located within a coverage area of the user's mobile terminal moving in time. This technique, however, essentially requires measurement of a user's locations at regular time intervals, which makes it difficult to execute a special computer algorithm for the location-history estimation.

In view of the foregoing, it would be desirable to estimate a user's significant place using a time series of actual locations of base stations connected, which are obtained at a coarse level of spatial granularity and at irregular time intervals.

In addition, it would be desirable to estimate a user's significant place using a time series of actual locations of base stations connected, which are obtained by the facilities of a telecommunication company at a coarse level of spatial granularity and at irregular time intervals.

According to a first aspect of the invention, an apparatus is provided for estimating significant places visited by users carrying respective mobile terminals for wireless communication via a plurality of base stations, the apparatus comprising:

a communication-log collector configured to collect, per each mobile terminal, at least one communication log represented with a plurality of consecutive communication events between each mobile terminal and connected one of the base stations in a coverage area of each mobile terminal, by receiving the communication events from the connected base station, the plurality of base stations being identified by a plurality of unique base-station identifiers (BS IDs), respectively, each communication event including date and time of communication and one of the BS IDs which is indicative of the connected base station;

a time-window divider configured to divide each communication log into a plurality of consecutive time-windowed segments, using a discrete time window moving in time, each time-windowed segment including a sub-set of the plurality of communication events;

a clusterer configured to generate a plurality of clusters each of which includes a sub-set of the plurality of BS IDs, based on co-occurrence of the BS IDs appearing in each time-windowed segment, to thereby assign at least one of the clusters which represents each time-windowed segment, as a representing cluster, to each time-windowed segment; and a significant-place estimator configured to estimate, per each time-windowed segment, at least one significant place visited by each user, based on the representing cluster.

In this regard, the term "significant place" may be defined by, but not limited to, a list of identifications of geospatial points which thereby represent geospatial regions by mapping the identifications of geospatial points on geospatial spaces.

According to a second aspect of the invention, a method is provided of estimating significant places visited by users carrying respective mobile terminals for wireless communication via a plurality of base stations, the method comprising:

per each mobile terminal, collecting at least one communication log represented with a plurality of consecutive communication events between each mobile terminal and connected one of the base stations in a coverage area of each mobile terminal, by receiving the communication events from the connected base station, the plurality of base stations being identified by a plurality of unique base-station identifiers (BS IDs), respectively, each communication event including date and time of communication and one of the BS IDs which is indicative of the connected base station;

dividing each communication log into a plurality of consecutive time-windowed segments, using a discrete time window moving in time, each time-windowed segment including a sub-set of the plurality of communication events;

generating a plurality of clusters each of which includes a sub-set of the plurality of BS IDs, based on co-occurrence of the BS IDs appearing in each time-windowed segment, to thereby assign at least one of the clusters which represents each time-windowed segment, as a representing cluster, to each time-windowed segment; and per each time-windowed segment, estimating at least one significant place visited by each user, based on the representing cluster.

In this regard, the term "significant place" may be defined by, but not limited to, a list of identifications of geospatial points which thereby represent geospatial regions by mapping the identifications of geospatial points on geospatial spaces.

According to a third aspect of the invention, a method is provided of estimating significant places visited by a user carrying a mobile terminal for wireless communication via a plurality of base stations, in the mobile terminal or a stationary device communicatively coupled with the base stations, the method comprising:

collecting at least one communication log represented with a plurality of consecutive communication events between the mobile terminal and connected one of the base stations in a coverage area of each mobile terminal, the plurality of base stations being identified by a plurality of unique base-station identifiers (BS IDs) respectively, each communication event including date and time of communication and one of the BS IDs which is indicative of the connected base station;

dividing each communication log into a plurality of consecutive time-windowed segments, using a discrete time window moving in time, each time-windowed segment including a sub-set of the plurality of communication events; and per each time-windowed segment, estimating at least one significant place visited by the user, based on a probability distribution with which the plurality of BS IDs appear in each time-windowed segment.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 6 is a table illustrating an exemplary communication log collected for a representative one of the mobile phones;

FIG. 7 is a table illustrating start times and end times of an exemplary time series of consecutive time-windowed segments of the communication log depicted in FIG. 6;

FIG. 8 is a table illustrating frequencies of base-station ID (hereinafter, "BS IDs") in each time-windowed segment of the communication log depicted in FIG. 6;

FIG. 9 is a table illustrating an exemplary relationship between the posterior probability distribution of the BS IDs and a latent topic that a mobile-phone user's activity is most related to, per each time-windowed segment of the communication log depicted in FIG. 6;

FIG. 10 is a table illustrating exemplary posterior probabilities that each communication event belongs to clusters per each time-windowed segment of the communication log depicted in FIG. 6;

FIG. 11 is a table illustrating exemplary values of hyper-parameters β calculated for an exemplary scenario depicted in FIG. 10, as an exemplary set of results of the clustering by HDP-LDA;

FIG. 12 is a table illustrating exemplary results of entropy-based determination made as to whether each cluster implicates that a mobile-phone user is staying or moving, in an exemplary scenario where probabilities that the mobile phone communicates with the base stations are indicated in FIG. 11;

FIG. 13 is a table illustrating exemplary original geographic locations of the base stations for the exemplary scenario depicted in FIG. 6;

FIG. 14 is a table illustrating corrected location coordinates of the base stations whose original location coordinates are depicted in FIG. 13;

FIG. 15 is a table illustrating the expected numbers of communications between each mobile phone and the base stations, per each cluster for the exemplary scenario depicted in FIG. 6;

FIG. 16 is a table illustrating variance-based determination as to whether the user is staying, for the exemplary scenario depicted in FIGS. 14 and 15;

FIG. 17 is a table illustrating exemplary significant places estimated by the SPED for the exemplary scenario depicted in FIG. 6; and FIG. 18 is a table illustrating exemplary data sets stored by the SPED for the exemplary scenario depicted in FIG. 6.

DETAILED DESCRIPTION OF THE INVENTION

Figure 1:
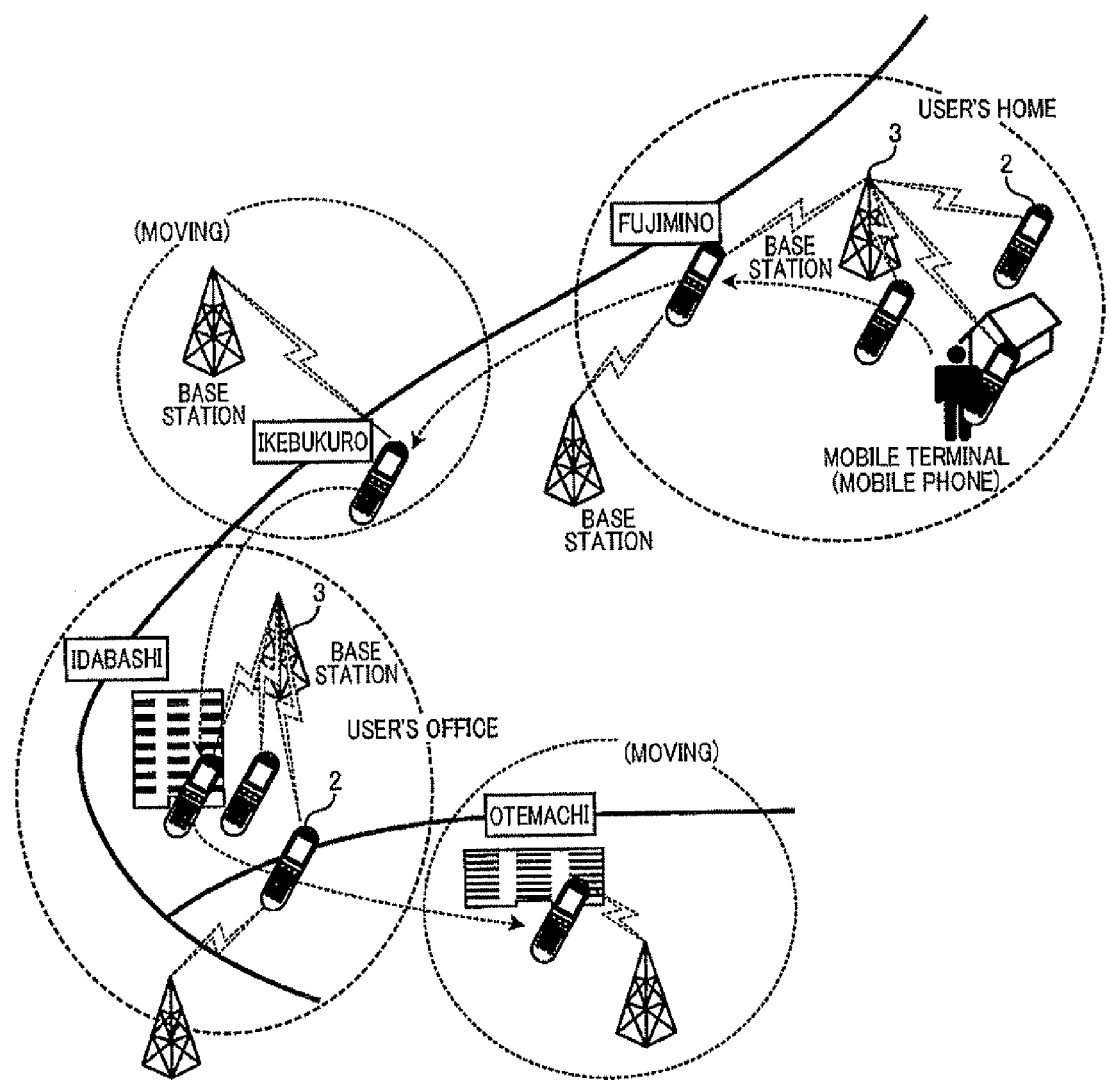
FIG. 1 is a view illustrating an exemplary wireless mobile-phone communication system in which mobile phones can be wirelessly connected to base stations or cell sites, and the base stations are communicatively linked with a significant-place estimation device (hereinafter, abbreviated as "SPED") constructed according to an illustrative embodiment of the present invention.

According to the invention, the following modes are provided as illustrative embodiments of the invention.

According to a first mode of the invention, there is provided the apparatus according to the first aspect of the invention, wherein the clusterer is further configured to generate a plurality of clusters each of which includes the sub-set of BS IDs, based on a probability distribution with which the plurality of BS IDs appear in each time-windowed segment, to thereby assign at least one of the clusters which represents each time-windowed segment, as the representing cluster, to each time-windowed segment.

According to a second mode of the invention, there is provided the apparatus according to the first mode, wherein the sub-set of communication events belonging to each time-windowed segment are denoted as a frequency vector, the frequency vector having a plurality of elements allocated to the plurality of BS IDs, respectively, each element of the frequency vector having a value indicative of a frequency with which a corresponding one of the BS IDs appears in the sub-set of communication events belonging to each time-windowed segment, the plurality of time-windowed segments are represented by a plurality of frequency vectors, respectively, and the clusterer is further configured to generate a plurality of clusters each of which includes a sub-set of the plurality of frequency vectors, based on values of distances between the frequency vectors each of which is measured by a distance metric, to thereby assign at least one of the clusters which represents each time-windowed segment, as the representing cluster, to each time-windowed segment.

According to a third mode of the invention, there is provided the apparatus according to the first aspect of the invention, wherein the clusterer is further configured to perform a topic-model-based estimation approach in which the plurality of time-windowed segments each of which is represented by the sub-set of communication events in each time-windowed segment are handled as a plurality of documents, respectively, the sub-set of BS IDs in each time-windowed segment are handled as a plurality of words of each document, respectively, and a plurality of latent topics of each document are estimated as a plurality of latent topics of the sub-set of communication events in each time-windowed segment, respectively, and is further configured to assign the plurality of latent topics to the plurality of clusters, to thereby assign the plurality of clusters to each time-windowed segment.

According to a fourth mode of the invention, there is provided the apparatus according to the third mode, wherein the topic-model-based estimation approach includes one of LDA (Latent Dirichlet Allocation), and HDP (Hierarchical Dirichlet Process)-LDA (Latent Dirichlet Allocation).

According to a fifth mode of the invention, there is provided the apparatus according to any one of the first aspect and the first through fourth modes, further comprising a stay determination unit configured to determine, per each cluster, whether each user is staying in a coverage area of at least specific one of the base stations, or moving, based on a probability distribution with which the plurality of BS IDs appear in a sub-set of some of the communication events that belong to each cluster, wherein the significant-place estimator is further configured to estimate that the coverage area is each user's significant place in life, if the stay determination unit determines that each user is staying in the coverage area.

According to a sixth mode of the invention, there is provided the apparatus according to the fifth mode, wherein the stay determination unit is further configured to determine, per each cluster, that each user is staying, if an entropy value of each time-windowed segment is lower than a threshold, the entropy value indicating randomness with which the plurality of BS IDs appear in the sub-set of communication events.

According to a seventh mode of the invention, there is provided the apparatus according to the sixth mode, wherein some of the plurality of communication events that belong to each cluster are denoted as a plurality of vectors, respectively, each vector having a plurality of elements allocated to the plurality of BS IDs, each element of each vector having a value indicative of a frequency with which a corresponding one of the BS IDs appears in each communication event, and the stay determination unit is further configured to determine, per each cluster, that each user is staying, if a variance on a 2-dimensional space where at least one of the plurality of BS IDs appearing in a sub-set of the communication events that belong to a cluster are mapped correspondent to geographical locations of the base stations.

According to an eighth mode of the invention, there is provided the apparatus according to any one of the first aspect and the first through seventh modes, wherein the communication-log collector is further configured to collect the communication log for an observation period spanning a plurality of days, and the significant-place estimator is further configured to measure, per each cluster, a characteristic which corresponding ones of the communication events belonging to each cluster exhibit on working days in the observation period, and a characteristic which the corresponding communication events exhibit on non-working days in the observation period, based on the collected communication log, to assign one of the clusters to each user's home, and one of the remaining ones of the clusters to each user's office/school, based on the measured characteristics, and to determine, each time-windowed segment, that each user's home is within each user's significant place, if the representing cluster is assigned to each user's home, and each user's office/school is within each user's significant place, if the representing cluster is assigned to each user's office/school.

According to a ninth mode of the invention, there is provided the apparatus according to the eighth mode, wherein each cluster includes at least one of the communication events, each communication event corresponds to one of the plurality of BS IDs, and the significant-place estimator is further configured to calculate at least two of: D which indicates a frequency with which the plurality of BS IDs appear in one of the communication events that belongs to any one of the clusters in the observation period; Dw which indicates a frequency with which the plurality of BS IDs appear in one of the communication events that belongs to any one of the clusters on working days in the observation period; and Dh which indicates a frequency with which the plurality of BS IDs appear in one of the communication events that belongs to any one of the clusters on non-working days in the observation period, based on the communication events, to calculate, per each cluster x, at least two of: nd(x) which indicates a frequency with which the plurality of BS IDs appear in one of the communication events that belongs to each cluster x in the observation period; ndw(x) which indicates a frequency with which the plurality of BS IDs appear in one of the communication events that belongs to each cluster x on working days in the observation period; and ndh(x) which indicates a frequency with which the plurality of BS IDs appear in one of the communication events that belongs to each cluster x on non-working days in the observation period, based on the communication events, and to assign one of the clusters to each user's home, and one of the remaining ones of the clusters to each user's office/school, such that one of the clusters which has a maximum nd(x)/D is assigned each user's home, and one of the remaining clusters which has a maximum ndw(x)/Dw is assigned each user's office/school, or such that, after selecting two of the clusters each of which has nd(x)/D larger than those of any other clusters, one of the selected two clusters which has ndw(x)/Dw larger than the other is assigned each user's office/school, and the other cluster is assigned each user's home, or such that, after selecting two of the clusters each of which has nd(x)/D larger than those of any other clusters, one of the selected two clusters which has ndh(x)/Dh larger than the other is assigned each user's home, and the other cluster is assigned each user's office/school.

According to a tenth mode of the invention, there is provided the apparatus according to any one of the first aspect and the first through ninth modes, wherein each mobile terminal includes a mobile phone, the apparatus is communicatively coupled with the plurality of base stations via a mobile phone communication network, and the apparatus is disposed as a facility of a carrier of the mobile phone communication network.

According to an eleventh mode of the invention, there is provided the method according to the third aspect of the invention, further comprising, per each time-windowed segment, determining whether the user is staying in a coverage area of at least specific one of the base stations, or moving, based on the distribution.

According to a twelfth mode of the invention, there is provided the method according to the eleventh mode, wherein the estimating operation includes:

estimating the user's life pattern on working days and the user's life pattern on non-working days, based on the communication logs collected for a plurality of days; and determining whether the user's significant place has the user's home or the user's office/school, based on the estimated user's life pattern on working days and the user's life pattern on non-working days.

According to a thirteenth mode of the invention, there is provided a computer-readable non-transitory storage medium having stored therein a program which, when executed by a computer, effects the method according to any one of the second and third aspects and the eleventh and twelfth modes or effects operation of the apparatus according to any one of the first through tenth modes.

The "computer-readable non-transitory storage medium" may be realized in any one of a variety of types, including a magnetic recording medium, such as a flexible disk or a hard disk drive, an optical recording medium, such as a CD or a CD-ROM, an optical-magnetic recording medium, such as an MO, an un-removable storage, such as a ROM or a RAM, for example.

Several presently preferred embodiments of the invention will be described in more detail by reference to the drawings in which like numerals are used to indicate like elements throughout.

Referring now to FIG. 1, an exemplary wireless mobile-phone communication system is geographically illustrated for an exemplary scenario in which a mobile terminal user or bearer (i.e., an individual) who carries a mobile terminal in the form of, for example, but not limited to, a mobile phone 2, stays at geospatial or physical places (including, for example, home or office) near some of a plurality of base stations 3 or cell sites, and moves through other geospatial or physical places (including, for example, train or subway stations or bus stops) near other base stations 3. The position of each mobile phone 2 refers to the position of its bearer, and the movement of each mobile phone 2 refers to the movement of its bearer.

The mobile terminal may take a variety of forms, including, but not limited to, a smart phone, a tablet, a personal computer, a Personal Data Assistants (PDAs), or any other type of device capable of wireless communication.

The plurality of base stations 3 are substantially sparsely distributed, and are identified by respective unique base-station identifiers or identifications (hereinafter, abbreviated as "BS IDs"). In an example, each BS ID is in the form of a 48-bit sequence comprised of a 24-bit MSB (Most Significant Bits) part which identifies a telecommunication carrier who provides a wide area wireless communication network, and a 24-bit LSB (Least Significant Bits) part.

The mobile phone 2, carried and moved by the user, is within a coverage area known as a cell covered by at least one of the base stations 3 which is the closest to the mobile phone 2 or has the best signal quality, while the mobile phone 2, despite the user's actual geospatial location, receives a radio wave from the one base station 3 without disruption even during the user's traveling.

An exemplary scenario depicted in FIG. 1, the user's home (i.e., home) is located at "Fujimino-shi, Saitama, Japan" and the user's office or workplace (i.e., office/school) is located at "Idabashi, Minato-ward, Tokyo, Japan." The user commutes from the user's home to the user's office via the city of "Ikebukuro, Toshima-ward, Tokyo, Japan." The user frequently travels to the city of "Otemachi, Chiyoda-ward, Tokyo, Japan" for visiting.

Facilities, including a significant-place estimation device 1 as described below, provided by a telecommunication company or carrier to collectively manage the base stations 3, can collect a time series of sets of location data indicative of the actual locations of the base stations 3, at a coarse level of spatial granularity and at irregular time intervals, on a per-mobile-phone basis.

The term "coarse level of spatial granularity" refers to the condition in which, because the base stations 3 are sparsely distributed, two sets of location data transmitted from adjacent two of the base stations 3 represent two locations which are geographically spaced apart by a considerably long distance. The term "irregular time intervals" refers to the condition in which adjacent two sets of location data are received from the base stations 3 at time intervals which vary with time to a considerable extent.

Throughout the specification, the term "home" refers to the user's principal place for life, and is exemplified by the address of the user's home, which forms the user's base for life. The term "office/school" refers to the place at which the user resides continuously, but on which the user depends less than the user depends on the user's principal place for life, and is exemplified by the address of the user's office or school.

Figure 2:
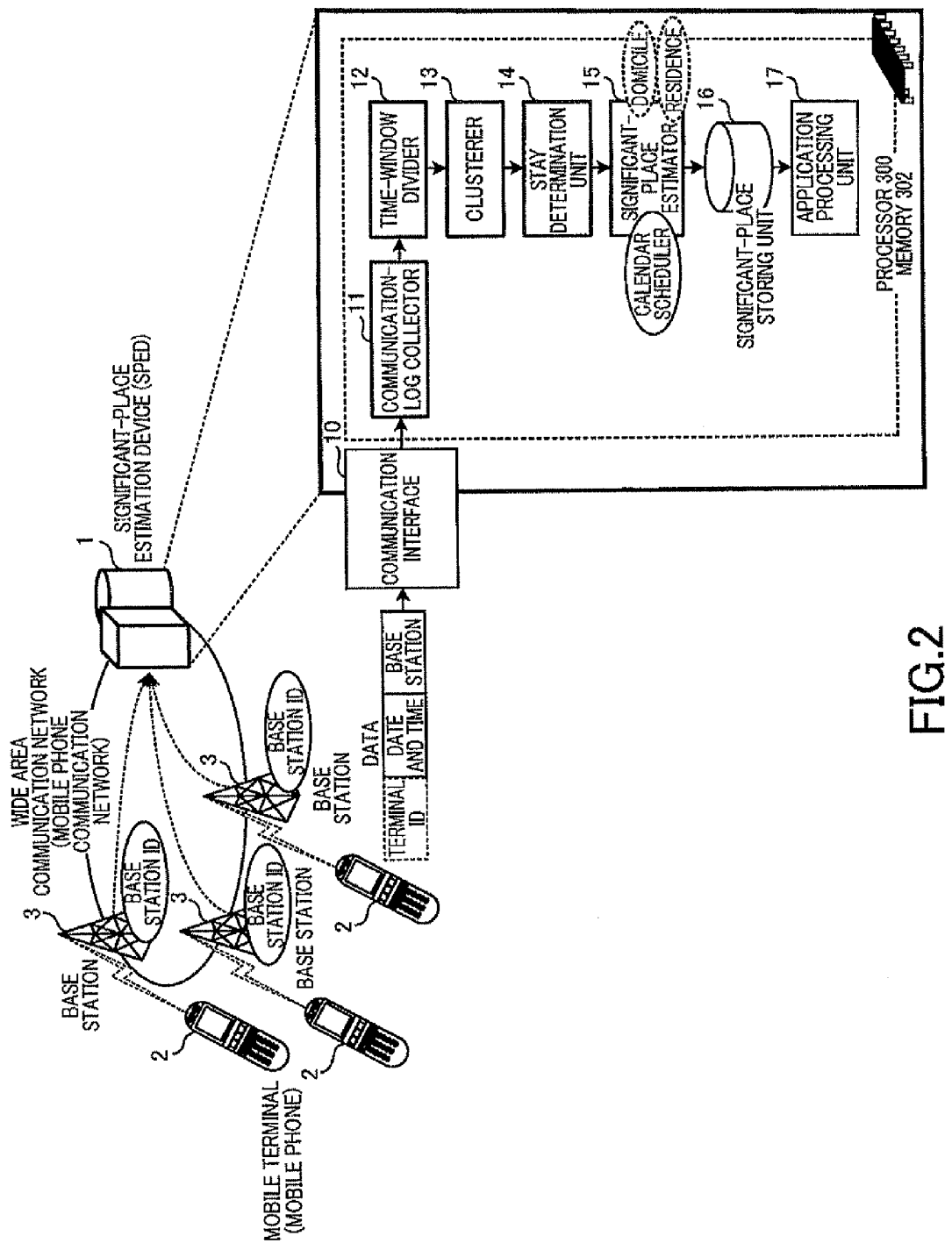
FIG. 2 is a functional block diagram illustrating an exemplary configuration of the SPED.

FIG. 2 is a functional block diagram illustrating an exemplary configuration of the significant-place estimation device (hereinafter, abbreviated as "SPED") 1, which is according to an illustrative embodiment of the invention. The SPED 1 is typically stationary, and is physically separated from the mobile phone 2.

The SPED 1 is further configured to send data of the estimated significant places of the users to the users' mobile phones 2 or other devices, in association with the users, respectively.

In the present embodiment, estimation of the users' significant places is performed in the SPED 1, but, in alternative implementations, the estimation may be performed in, for example, each mobile phone 2, each base station 3 or any other remote device.

Figure 3:
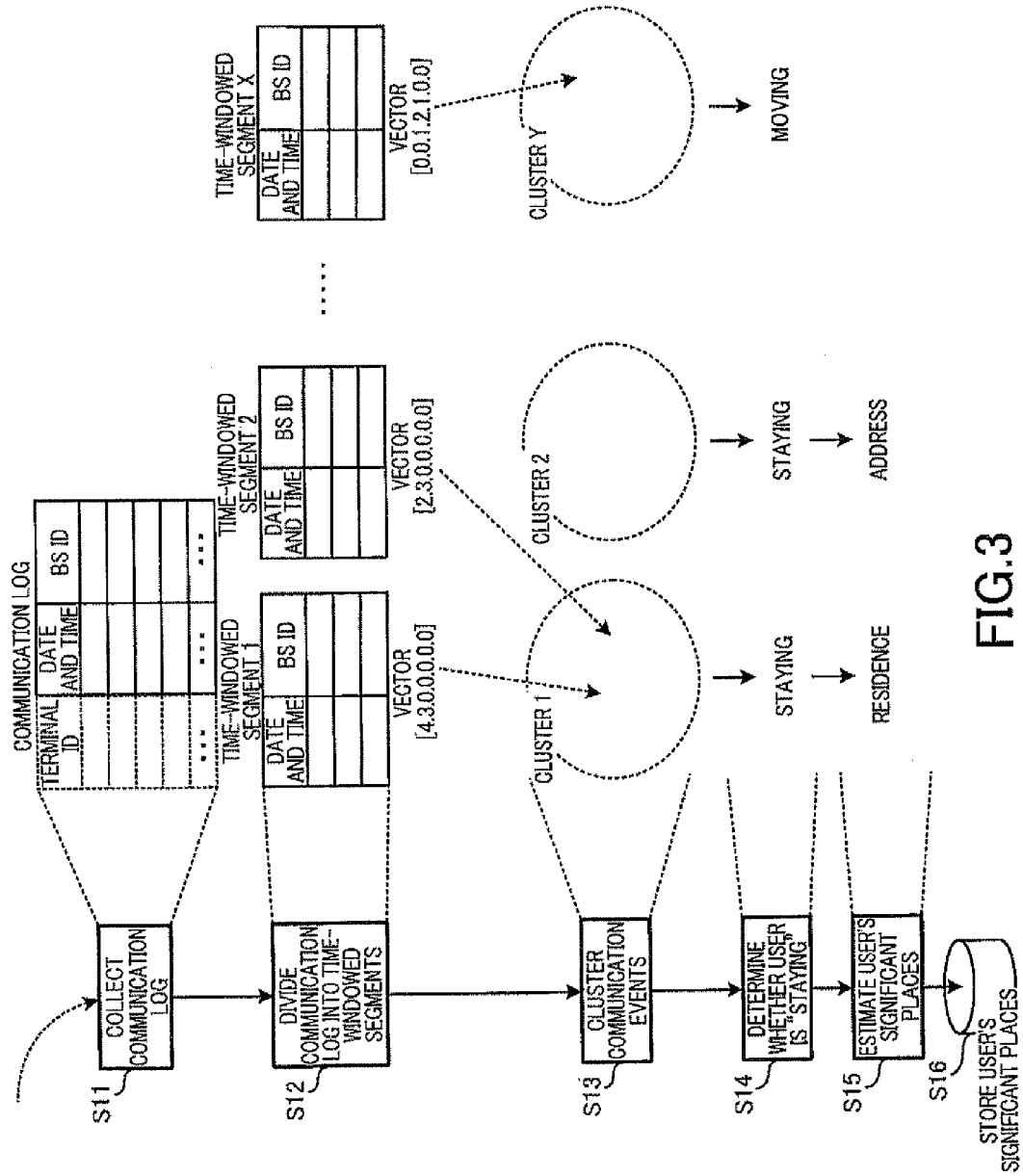
FIG. 3 is a flowchart conceptually illustrating an exemplary version of a significant-place estimation process according to an illustrative embodiment of the invention, which is performed by the SPED.

FIG. 3 is a flowchart illustrating an exemplary version of a significant-place estimation process according to an illustrative embodiment of the invention, which is performed by the SPED 1.

As illustrated in FIG. 2, the base stations 3 are communicatively coupled with the wide area wireless communication network (i.e., a mobile-phone communication network).

As well known, for performing mobile positioning, each mobile phone 2 establishes a connection with at least one of the base stations 3 within an area covered by each mobile phone 2, repeatedly or frequently, after each mobile phone 2 has been powered on. During the mobile positioning, each base station 3 exchanges wireless frame signals with each mobile phone 2, to thereby recognize or identify each mobile phone 2 and record date and time of communication. Each base station 3 sends data of a communication event to the SPED 1 via, the mobile-phone communication network.

For making an active call, each mobile phone 2 also establishes a connection with each base station 3 within an area covered by each mobile phone 2. In this situation, each base station 3 also sends data of a communication event to the SPED 1.

Throughout the specification, the term "communication event" refers to a communication event (not an active call event) for the mobile positioning, and optionally also refers to an active call event. In the present embodiment, the term "communication event" includes, but not limited to, both a communication event for the mobile positioning and an active call event.

In any case, the communication event includes: a terminal ID such as a phone ID of each mobile phone 2 (e.g., an IMSI (International Mobile Subscriber Identity), an IMEI (International Mobile Equipment Identity), an MEID (Mobile Equipment Identifier), an ICCID, a unique network address, a phone number, an ID number, etc.), a BS ID indicative of one of the base stations 3 connected by each mobile phone 2, and the date and time of the communication, etc., as follows:

Communication Event: terminal ID, BS ID, date and time of communication, etc.

The SPED 1, which is communicatively coupled with the wide area wireless communication network (i.e., the mobile phone communication network), is configured to estimate one or more significant or meaningful geospatial places, areas or regions visited by the user who carries the mobile phone 2 while traveling.

The SPED 1 can directly map each BS ID included in each communication event received from the mobile phone 2, to a point of physical location of the corresponding one of the base stations 3, according to a mapping table available in the SPED 1.

It is noted that a place visited by a user may be considered "significant" as a place the user visits for a significant period of time or having a significant value in the user's daily activities. Typically, a user's significant place can include the user's home, office or school that are examples of the user's frequently recurring place.

As illustrated in FIG. 2, the SPED 1 is configured to include a communication interface 10 that allows the SPED 1 to communicate with the base stations 3 or related system to the base stations 3, which are exemplified by a base station controller, a mobile switching center, or an operations-and-maintenance center, via the mobile phone communication network; a communication-history collector 11; a time-window divider (or time-window observer) 12; a clusterer 13; a stay determination unit 14; a significant-place estimator 15; a significant-place storing unit 16; and an application processing unit 17. These components excepting the communication interface 10 are implemented by operating a processor 300 built in the SPED 1 to execute a predetermined computer program (conceptually shown in FIG. 3 in flowchart) using a memory 302. These components excepting the communication interface 10 will be described below.

[Communication-Log Collector]

The communication-log collector 11 (shown in FIG. 3 at S11) is configured to collect, each mobile phone 2, at least one communication log represented with a plurality of consecutive communication events (including data communication events and actual calls) between each mobile phone 2 and connected one of the base stations 3 which covers an area in which each mobile phone 2 is located, by receiving the communication events from the connected base station 3 through the mobile phone communication network. The plurality of base stations 3 are identified by a plurality of unique base-station identifiers (BS IDs), respectively. Each communication event includes date and time of communication and one of the BS IDs which is indicative of the connected base station 3. The communication-log collector 11 generates communication logs for the mobile phones 2, respectively.

FIG. 6 illustrates an exemplary communication log collected for a representative one of the mobile phones 2, with the communication log including a time series of communication events.

[Time-Window Divider]

The time-window divider 12 (shown in FIG. 3 at S12) is configured to divide each communication log into a plurality of consecutive time-windowed segments, using a discrete time window moving in time. Each time-windowed segment includes a sub-set (i.e., one or more) of the plurality of communication events, where the time-windowed segments are equal in time length to each other.

The time window has a pre-selected time width T, and is moved or shifted relative to each communication log at time intervals of a pre-selected shift width S. A newer one of adjacent two time-windowed segments has a start time which is later by the same time as the shift width S since a start time of an older time-windowed segment. When T>S, adjacent two time-windowed segments have a partially overlapping region with a time length of (T−S).

FIG. 7 illustrates start times and end times of an exemplary time series of consecutive time-windowed segments for use in an exemplary scenario depicted in FIG. 6, where T=60 [min] and S=15 [min].

The time-window divider 12 may be further configured to measure the frequency of per-type BS IDs in each time-windowed segment (i.e., how many the same BS IDs appear in each time-windowed segment, or the number of appearance of the same BS IDs, per each type of BS ID).

In the exemplary scenario depicted in FIG. 6, when using the exemplary time series of consecutive time-windowed segments depicted in FIG. 7, the frequencies of per-type BS IDs are measured such that a first time-windowed segment from 18:00:00 to 18:59:59 (shown in FIG. 7 at time-windowed segment No. 1) has four BS IDs for base station No. 1 (hereinafter, "BS No. 1"), and three BS IDs for base station No. 2 (hereinafter, "BS No. 2").

In the same scenario, the frequencies of BS IDs of each type are measured such that a second time-windowed segment from 18:15:00 to 19:14:59 (shown in FIG. 7 at time-windowed segment No. 2) has two BS IDs for BS No. 1, and three BS IDs for BS No. 2.

In the same scenario, the frequencies of per-type BS IDS are measured for the subsequent time-windowed segments in the same manner mentioned above.

FIG. 8 illustrates the frequencies of BS IDs in each time-windowed segment for the exemplary scenario depicted in FIG. 6.

Despite that communication events do not always occur at regular time intervals, the time-window divider 12 generates a succession of frames having the same time lengths, and therefore, the SPED 1 can estimate each user's significant place at regular time intervals, unless there is no communication event found for the user, which means that no communication event from the user's mobile phone 2 is collected.

[Clusterer]

The clusterer 13 (show in FIG. 3 at S13) is configured to generate a plurality of clusters of the plurality of BS IDs, based on co-occurrence of the BS IDs appearing in each time-windowed segment, to thereby assign at least one of the clusters which most likely represents each time-windowed segment, as a representing cluster, to each time-windowed segment.

The clusterer 13 can take the form of, but not limited to, hierarchical clustering or non-hierarchical clustering, or hard clustering or soft clustering, which is realized, by way of example, using a topic model such as LDA (Latent Dirichlet Allocation) or a non-parametric topic model such as HDP (Hierarchical Dirichlet Process)-LDA (Latent Dirichlet Allocation).

<Clustering Analysis>

In an exemplary implementation where the clusterer 13 uses a cluster analysis such as a bottom-up hierarchical clustering, the clusterer 13 may be further configured to generate a tree-structured hierarchy of clusters usually presented in a dendrogram, by incrementally merging some of the sub-set of time-windowed segments, to thereby assign a sub-hierarchy of the hierarchy of clusters to which each time-windowed segment belongs, to each time-windowed segment.

More specifically, in this implementation, as illustrated in FIG. 3, the sub-set of communication events belonging to each time-windowed segment are collectively denoted as a frequency vector. The frequency vector has a plurality of elements or dimensions allocated to the plurality of BS IDs. Each element of the frequency vector has a value indicative of a frequency with which a corresponding one of the BS IDs appears in a collection of communication events belonging to each time-windowed segment.

In this arrangement, as illustrated in FIG. 3, the frequency vectors for the time-windowed segments are incrementally merged, based on values of distances between the frequency vectors each of which is measured by a distance metric (e.g., a cosine distance), to thereby generate a tree-structured hierarchy of clusters.

In an exemplary scenario depicted in FIG. 3, it is determined that time-windowed segment Nos. 1 and 2 fall within cluster No. 1, meaning that time-windowed segment Nos. 1 and 2 are clustered together, based on the values of distances between the frequency vectors for a series of time-widowed segments including time-windowed segment Nos. 1 and 2.

<Topic-Model-Based Estimation>

In an alternative implementation, the clusterer 13 may be further configured to perform a topic-model-based estimation approach in which the plurality of time-windowed segments each of which is represented by the sub-set of communication events in each time-windowed segment are handled as a plurality of documents, respectively, the sub-set of BS IDs in each time-windowed segment are handled as a plurality of words of each document, respectively, and a plurality of latent topics of each document are estimated as a plurality of latent topics of the sub-set of communication events in each time-windowed segment, respectively.

The clusterer 13 may be further configured to assign the plurality of latent topics to the plurality of clusters, to thereby assign a plurality of clusters of the BS IDs to each time-windowed segment.

It can be assumed that the per-BS frequencies of the BS IDs appearing in each time-windowed segment are distributed according to a topic-specific probability distribution. Every latent topic is represented by a topic-specific multinomial probability distribution, within each time-windowed segment.

In an exemplary scenario where the mobile-phone user travels from stay point A to stay point B, the latent topics can be assumed by way of example as follows:

1) Staying at Point A;
2) Staying at Point B; and
3) Moving or traveling.

In this example, although the third topic can include various kinds of species, these species are grouped into one category. In an alternative, these species, however, may be grouped into two or more categories.

It can be assumed that, if the latent topic is considered as "staying," the mobile phone 2 experiences communication events with a smaller number of ones of the base stations 3 in the vicinity of the actual position of the mobile phone 2, and, if the latent topic is considered as "moving," the mobile phone 2 experiences communication events with a larger number of ones of the base stations 3 in the vicinity of the route along which the user travels.

FIG. 9 illustrates an exemplary relationship between the distribution of the frequencies of the base stations 3 and the latent topic that the user's activities are most related to, for the exemplary scenario depicted in FIG. 6.

<LDA>

Figure 4:
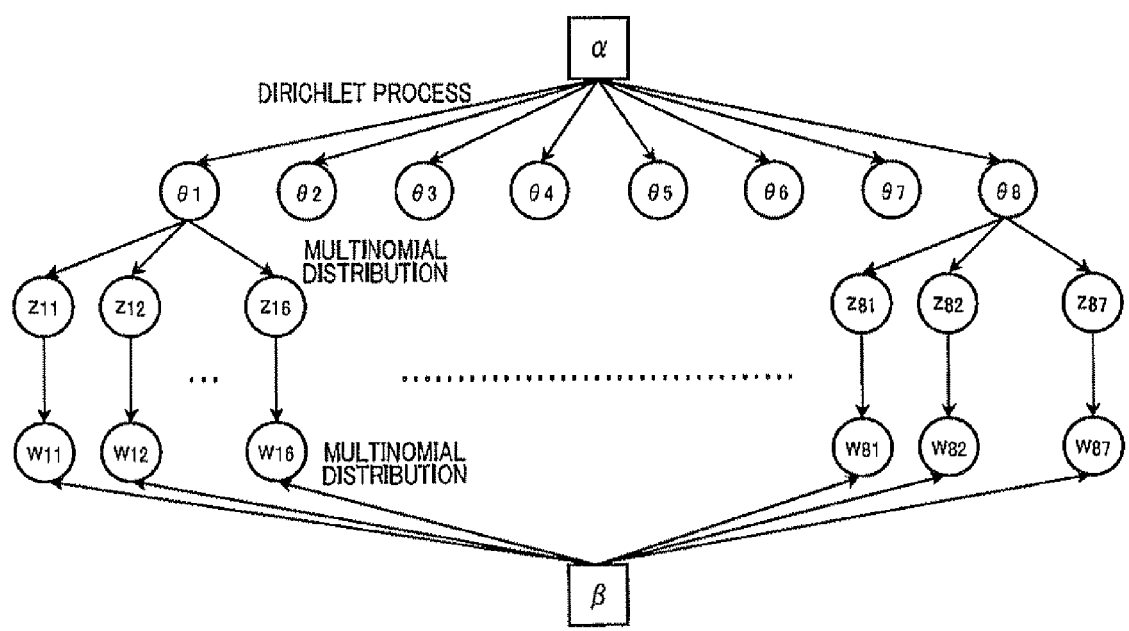
FIG. 4 is a view illustrating an exemplary directed acyclic graph (DAG) expression of a Bayesian network model representing an LDA model.

FIG. 4 illustrates an exemplary directed acyclic graph (DAG) expression of a Bayesian network model representing an LDA model. In the drawing and FIG. 5 mentioned below:

$w_{ij}$: j-th BS ID observed (i.e., BS ID contained in j-th communication event) in time-windowed segment i;

$z_{ij}$: latent topic for j-th BS ID in time-windowed segment i;

$\theta_i$: parameter of topic distribution for time-windowed segment i, which is time-windowed segment-specific, in the form of a k-element vector (k: total number of latent topics); and $\alpha$: hyperparameters, that is, parameters of the Dirichlet prior on the per-time-windowed segment topic distribution; and $\beta$: hyperparameters, that is, parameters of the Dirichlet prior on the per-topic BS-ID distribution.

In this LDA model, after calculating the posterior probability distribution of $z_{ij}$ and $\theta_i$ and the optimum values of $\alpha$ and $\beta$ (type II maximum likelihood estimates), the latent topics of the user's activities can be estimated from the communication log generated between each mobile phone 2 and each base station 3, per each mobile phone 2, within each time-windowed segment, and the observed BS IDs are classified into the estimated latent topics (i.e., clusters), that is, a posterior probability that the observed BS IDs belong to each latent topic is calculated, per each time-windowed segment. In an alternative, a prior probability distribution may be prepared for the parameters $\beta$.

<HDP-LDA>

Figure 5:
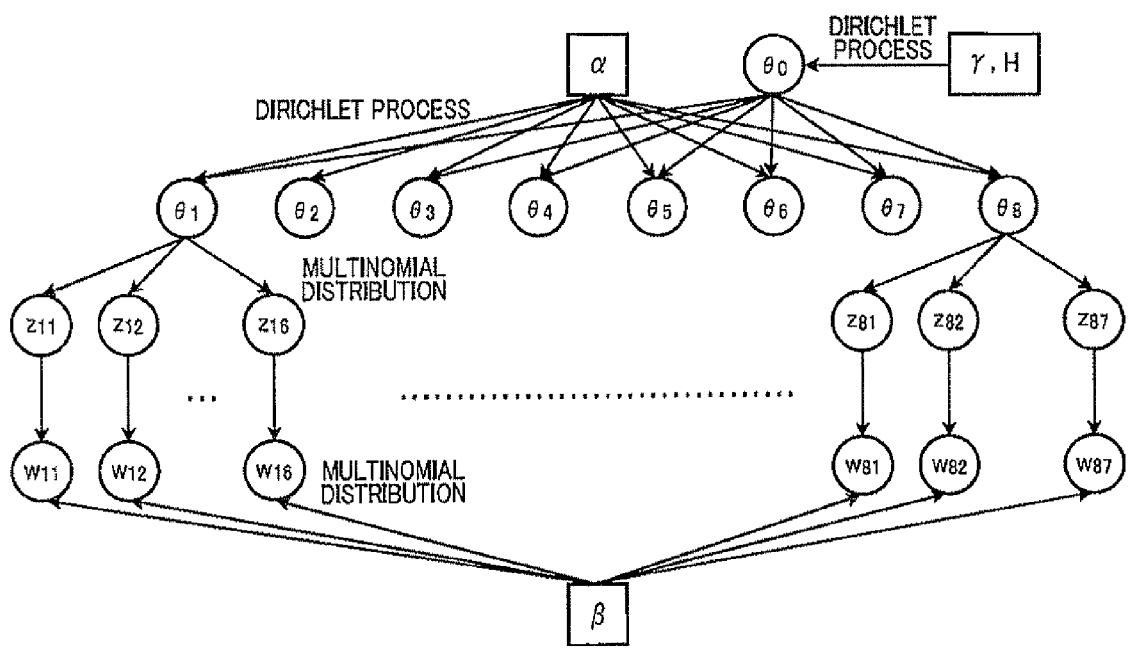
FIG. 5 is a view illustrating an exemplary stochastic network diagram of HDP-LDA or an HDP-LDA model.

FIG. 5 illustrates an exemplary directed acyclic graph (DAG) expression of a Bayesian network model representing an HDP-LDA model.

In the drawing:

$\theta_0$: base measure;
$\gamma$: concentration parameter; and
H: base measure.

While the above-described LDA requires pre-selection of the number of topics considered, HDP-LDA allows the required number of topics to be automatically determined according to the complexity of data concerned.

To the end, HDP-LDA estimates the distributions of $\theta_0$, $z_{ij}$ and $\theta_i$, and the optimum values of $\alpha$ and $\beta$. The number of the dimensions of $\theta_i$ (i.e., k-element vector for time-windowed segment i), that is, the total number of latent topics is determined depending on the parameters $\alpha$ during the Dirichlet process, without need of previous determination of the total number of latent topics.

Whether LDA or HDP-LDA is employed, the SPED 1 calculates the posterior probability distribution of $z_{ij}$ and $\theta_i$ using an approximation technique such as a variational Bayes method or a Markov Chain Monte Carlo method.

FIG. 10 illustrates an exemplary set of results of the clustering by HDP-LDA, which demonstrates posterior probabilities that each communication event (or each BS ID or each DS) belongs to clusters per each time-windowed segment.

In this example, cluster Nos. 1-3 correspond to latent topics "staying at point A," "staying at point B," and "moving," respectively. The time-windowed segments are represented by at least one of cluster Nos. 1-3. For example, time-windowed segment Nos. 1 and 2 are represented by cluster No. 1, time-windowed segment Nos. 3-6 are represented by cluster No. 3, and time-windowed segment Nos. 7-9 are represented by cluster No. 2.

FIG. 11 illustrates exemplary values of the hyperparameters $\beta$ calculated for an exemplary scenario which is depicted in FIG. 10 and there are a time series of nine time-windowed segments, as a result of the clustering by HDP-LDA. The hyperparameters $\beta$ are a collection of parameters indicating, for each latent topic or cluster, the probabilities that the mobile phone 2 communicates with the plurality of different base stations 3, respectively, or the probabilities that communication events belonging to each cluster are related to the plurality of different base stations 3, respectively.

In this example, cluster No. 1 implicates that the user is staying at Point A, cluster No. 3 implicates that the user is staying at Point B, and cluster No. 2 implicates that the user is moving.

[Stay Determination Unit]

The stay determination unit 14 (show in FIG. 3 at S14) is configured to determine, per each cluster, whether each user is staying in a coverage area or cell of at least specific one of the base stations 3, or moving, based on a posterior probability distribution with which the plurality of BS IDs appear in a sub-set of some of the communication events that belong to each cluster.

The stay determination unit 14 may take the forms of, but not limited to, an entropy-based determination approach or a variance-based determination approach.

<1> In an exemplary implementation, the stay determination unit 14 determines, per each cluster, that each user is staying, if an entropy value of each time-windowed segment is lower than a threshold. The entropy value indicates an amount of randomness with which BS IDs appear in the sub-set of communication events. In contrast, the stay determination unit 14 determines that each user is moving, if the entropy value is higher than the threshold.

<2> In an alternative exemplary implementation, some of the sub-set of communication events that belong to each cluster are denoted as a plurality of vectors (e.g., frequency vectors, feature vectors), respectively. Each vector has a plurality of elements allocated to the plurality of BS IDs. Each element of each vector has a value indicative of a frequency with which a corresponding one of the BS IDs appears in each communication event.

In this implementation, the stay determination unit 14 determines, per each cluster, that each user is staying, if the variance of a sub-set of the plurality of vectors which indicate some of the plurality of communication events that belong to each cluster is lower than a threshold.

<Entropy-Based Approach>

In this approach, using the values of the hyperparameters 3, which are, as described above, calculated during the clustering by HDP-LDA, and are a collection of parameters indicating, for each cluster, the probabilities that the mobile phone 2 communicates with the plurality of different base stations 3, respectively, the entropy value is calculated, which indicates randomness of a posterior probability distribution with which the plurality of BS IDs appear in the sub-set of communication events. Based on the entropy value, a determination is made as to whether each user is staying.

The "entropy," which is a term used in the discipline of information theory, refers to an amount of randomness of the random variable indicative of the randomness with which BS IDs appear in the sub-set of communication events. A situation where an event is likely to occur with smaller randomness, such as where each mobile-phone user is staying, can be considered significant to the user, while a situation where an event is likely to occur with larger randomness, such as where each mobile-phone user is moving, can be considered less significant to the user.

More specifically, this entropy-based approach is performed in the exemplary following manner:

(1) Step 1

Entropy value "entropy$_i$" is calculated for cluster i, using probability p$_{ij}$ that the mobile phone 2 communicates with each base station j, by the following formula, wherein the entropy value indicates the amount of randomness of the BS IDs in each cluster:

$$\text{entropy}_i = -\Sigma p_{ij} \times \log(p_{ij}).$$

In an exemplary scenario depicted in FIG. 11, probabilities p$_{ij}$ (j=1–J) for cluster No. 1 (i=1) take the following values:

{0.49, 0.49, 0.01, 0.01, 0.0, 0.0, 0.0}.

The calculation of entropy$_1$ takes the following expression:

$$-0.49 \times \log(0.49) - 0.49 \times \log(0.49) - 0.01 \times \log(0.01) - 0.01 \times \log(0.01).$$

As a result, entropy$_1$ is approximately 0.34.

(2) Step 2

The plurality of clusters are sorted in entropy-ascending order.

(3) Step 3

At least one of the clusters which has the entropy value equal to or greater than a threshold TH is determined to be a user-moving cluster, and at least one of the clusters which has the entropy value smaller than the threshold TH is determined to be a user-staying cluster.

FIG. 12 illustrates exemplary results of the entropy-based determination made as to whether each cluster implicates that the user is staying or moving, in an exemplary scenario where the probabilities that the mobile phone 2 communicates with the base stations 3 are indicated in FIG. 11, and where TH=0.5. As will be understood below, cluster Nos. 1 and 2 are determined that they implicate that the user is staying, while cluster No. 3 is determined that it implicate that the user is moving.

<Variance-Based Approach>

FIG. 13 illustrates exemplary original geographic locations of the base stations 3 which are stationary except when the base stations 3 are updated by moving the exiting base stations 3 within the wide area communication network or by replacing some of them with others, or by adding new base stations to the wide area communication network, and their latitude and longitude coordinates are known and remain unchanged. The variance-based approach is performed such that, using the geographic locations of the base stations 3, a variance-covariance matrix for communication events that belong to each cluster is defined, the eigenvalue of the variance-covariance matrix is calculated per each cluster, and a determination is made as to whether each cluster implicates that the user is staying or moving, based on the calculation of the eigenvalue, per each cluster.

More specifically, this variance-based approach is performed in the exemplary following manner:

(1) Step 1

To the geometry of the coverage area of the mobile phone 2, the original geographical locations of the base stations 3 depicted in FIG. 13 are corrected, and the corrected locations of the base stations 3 will be used for defining the variance-covariance matrix.

The location correction is made, under the condition that one degree of latitude equals approximately 111.3 km, and one degree of longitude equals approximately 90.8 km, at the average point (Latitude: 35.4 deg., Longitude: 135.8 deg.) of the original geographical locations of the base stations 3, to thereby obtain corrected location coordinates x$_j$, y$_j$ of each base station j which are listed in FIG. 14, from original latitude and longitude coordinates lat$_j$, lon$_j$ of each base station j, using the following equation:

$$\begin{pmatrix} x_j \\ y_j \\ 1 \end{pmatrix} = \begin{pmatrix} 90.8 & 0 & -35.4 \times 90.8 \\ 0 & 111.3 & -135.8 \times 111.3 \\ 0 & 0 & 1 \end{pmatrix} \begin{pmatrix} lon_j \\ lat_j \\ 1 \end{pmatrix}$$

For greater precision, the location correction may be preferably made using a spheroid approximating the Earth's shape.

(2) Step 2

Next, calculation is made of expected number $n_{ij}$ with which the mobile phone 2 communicates with each base station j per each cluster i, based on the posterior probabilities that each communication event belongs to clusters i per each time-windowed segment (shown in FIG. 10), and the number with which the mobile phone 2 communicates with each base station j per cluster i (shown in FIG. 9). For cluster No. 1 (i=1) and base station No. 1 (j=1), expected number $n_{11}$ is calculated as follows:

$$n_{11} = 0.99 \times 4.0 + 0.98 \times 2.0 = 5.92.$$

FIG. 15 illustrates the expected numbers of communications between the mobile phone 2 and the base stations 3, per each cluster.

(3) Step 3

The variance-covariance matrix $S_i$ is defined for each cluster i, using the following equation:

$$S_i = \begin{pmatrix} \frac{1}{n}\sum_j n_{ij}x_j^2 - \left(\frac{1}{n}\sum_j n_{ij}x_j\right)^2 & \frac{1}{n}\sum_j n_{ij}x_jy_j - \left(\frac{1}{n}\sum_j n_{ij}x_j\right)\left(\frac{1}{n}\sum_j n_{ij}y_j\right) \\ \frac{1}{n}\sum_j n_{ij}x_jy_j - \left(\frac{1}{n}\sum_j n_{ij}x_j\right)\left(\frac{1}{n}\sum_j n_{ij}y_j\right) & \frac{1}{n}\sum_j n_{ij}y_j^2 - \left(\frac{1}{n}\sum_j n_{ij}y_j\right)^2 \end{pmatrix}$$

An exemplary version of the variance-covariance matrix $S_1$ for cluster No. 1 is as follows:

$$S_1 = \begin{pmatrix} 95.61 & 42.64 \\ 42.64 & 157.02 \end{pmatrix}$$

(4) Step 4

Next, maximum eigenvalue $\lambda_i$ (the variance of the first principal component score, resulting from a principal component analysis) of variance-covariance matrix $S_i$ for cluster i is calculated. For an exemplary scenario depicted in FIGS. 14 and 15, maximum eigenvalue $\lambda_1$ is equal to 178.83.

(5) Step 5

Next, all the clusters are sorted in eigenvalue-ascending order (in which maximum eigenvalues $\lambda_i$ of variance-covariance matrices $S_i$ for clusters i are ascending).

(6) Step 6

Then, at least one of the clusters whose maximum eigenvalue is equal to or greater than a threshold TH is determined to be a user-moving cluster, while at least one of the clusters whose maximum eigenvalue is smaller than the threshold TH is determined to be a user-staying cluster.

In an exemplary scenario depicted in FIGS. 14 and 15 where TH=2,000, cluster Nos. 1 and 2 are determined to be a user-staying cluster, while cluster No. 3 is determined to be a user-moving cluster.

FIG. 16 illustrates the variance-based determination as to whether the user is staying, for the exemplary scenario depicted in FIGS. 14 and 15.

[Significant-Place Estimator]

The significant-place estimator 15 (shown in FIG. 3 at S15) is configured to estimate, per each time-windowed segment, at least one significant place visited by each user, based on at least one of the clusters which represents each time-windowed segment.

Each user's significant place refers to a place which is visited by each user and is significant to each user, which includes each user's home and office/school.

In the exemplary scenario depicted in FIG. 10, time-windowed segment Nos. 1 and 2 are represented by cluster No. 1 (associated base station Nos. 1 and 2), time-windowed segment Nos. 3-6 are represented by cluster No. 3, and time-windowed segment Nos. 7-9 are represented by cluster No. 2 (associated base station. Nos. 6 and 7).

More specifically, the significant-place estimator 15 is further configured to estimate that a coverage area of the mobile phone 2 is its user's significant place in life, if the stay determination unit 14 determines that the user is staying in the coverage area of the mobile phone 2.

In the exemplary scenario depicted in FIG. 10, the significant-place estimator 15 can estimate that the user is staying in a significant place near base station Nos. 1 and 2 for time-windowed segment Nos. 1 and 2, and that the user is staying in a significant place near base station Nos. 6 and 7 for time-windowed segment Nos. 7-9.

In an exemplary implementation, the significant-place estimator 15 is further configured to determine whether each user's significant place has each user's home or office/school.

More specifically, in this implementation, the communication-log collector 11 is further configured to collect the communication log for an observation period spanning a plurality of days.

In this implementation, the significant-place estimator 15 is further configured to measure, per each cluster, a characteristic (e.g., each user's life pattern on working days or business days) which corresponding ones of the communication events belonging to each cluster exhibit on working days in the observation period, and a characteristic (e.g., each user's life pattern on non-working days or non-business days) which the corresponding communication events exhibit on non-working days in the observation period, based on the collected communication log.

In this context, the term "working day" refers to a day on which each user is scheduled not to work in an office or a school, and the term "non-working day" refers to a day on which each user is scheduled to work in an office or a school. When these working days and non-working days are determined according to a common calendar, the working days can be paraphrased with weekdays, and the non-working days can be paraphrased with holidays. Alternatively, these working days and non-working days can be determined according to each user's unique schedule.

In order to determine whether each day is a working day or a non-working day, the significant-place estimator 15 is configured to store therein data of calendar, or to utilize a calendar/scheduler application built in each mobile phone 2 to read out a common calendar or each user's unique schedule from each user's mobile phone 2.

The significant-place estimator 15 is further configured to assign one of the clusters to each user's home, and one of the remaining ones of the clusters to each user's office/school, based on the measured characteristics.

The significant-place estimator 15 is further configured to determine, each time-windowed segment, which place in each user's significant places is correspondent to each user's home, if the representing cluster is assigned to each user's home, and which place in each user's significant places is correspondent to each user's office/school, if the representing cluster is assigned to each user's office/school.

More specifically, in this implementation, each cluster includes at least one of the communication events, and each communication event corresponds to one of the plurality of BS IDs.

The significant-place estimator 15 is further configured to calculate at least two of:

D: a frequency with which the plurality of BS IDs appear in one of the communication events that belongs to any one of the clusters in the observation period;

Dw: a frequency with which the plurality of BS IDs appear in one of the communication events that belongs to any one of the clusters on working days in the observation period; and Dh: a frequency with which the plurality of BS IDs appear in one of the communication events that belongs to any one of the clusters on non-working days in the observation period, based on the communication events.

The significant-place estimator 15 is further configured to calculate, per each cluster x, at least two of:

nd(x): a frequency with which the plurality of BS IDs appear in one of the communication events that belongs to each cluster x in the observation period;

ndw(x): a frequency with which the plurality of BS IDs appear in one of the communication events that belongs to each cluster x on working days in the observation period; and ndh(x): a frequency with which the plurality of BS IDs appear in one of the communication events that belongs to each cluster x on non-working days in the observation period, based on the communication events.

The significant-place estimator 15 is further configured to calculate, per each cluster x, at least two of:

$R(x): nd(x)/D;$ $Rw(x): ndw(x)/Dw;$ and $Rh(x): ndh(x)/Dh.$

The significant-place estimator 15 is further configured to assign one of the clusters to each user's home, and one of the remaining ones of the clusters to each user's office/school, according to a selected one of the following assignment rules:

(1) Rule 1

One of the clusters which has a maximum nd(x)/D is assigned each user's home, and one of the remaining clusters which has a maximum ndw(x)/Dw is assigned each user's office/school.

(2) Rule 2

After selecting two of the clusters (clusters A and B, for example) each of which has nd(x)/D larger than those of any other clusters, one of the selected two clusters which has ndw(x)/Dw larger than the other is assigned each user's office/school, and the other cluster is assigned each user's home, that is, if Rw(A)>Rw(B), then cluster A is assigned "office/school," while cluster B is assigned "home," and if Rw(A)<Rw(B), then cluster A is assigned "home," while cluster B is assigned "office/school," and if Rw(A)=Rw(B), then one of clusters A and B which has larger Rh(x) is assigned "home."

(3) Rule 3

After selecting two of the clusters each of which has nd(x)/D larger than those of any other clusters, one of the selected two clusters which has ndh(x)/Dh larger than the other is assigned each user's home, and the other cluster is assigned each user's office/school, that is, if Rh(A)>Rh(B), then cluster A is assigned "home," while cluster B is assigned "office/school," and if Rh(A)<Rh(B), then cluster A is assigned "office/school," while cluster B is assigned "home," and if Rh(A)=Rh(B), then one of clusters A and B which has larger Rw(x) is assigned "office/school."

In the exemplary scenario depicted in FIG. 17, cluster No. 2 is determined to be a cluster of "home," while cluster No. 1 is determined to be a cluster of "office/school."

[Significant-Place Storing Unit]

The significant-place storing unit 16 (shown in FIG. 3 at S16) is configured to store in a storage device (now shown) a data set of cluster IDs of the clusters, the BS IDs, the posterior probabilities, latitude and longitude coordinates (optional), and labels of significant places indicating whether the user is staying or moving and the user's significant place is a home or an office/school (optional), in association with each other, like in FIG. 18. The term "posterior probabilities" refers to probabilities that each mobile phone 2 communicates with the base stations 3 per each cluster, and the posterior probabilities are stored in the storage device, in the form of the hyperparameters β calculated by the clusterer 13 illustrated in FIG. 11.

The data set is comprised of a plurality of data subset, and each data subset includes a cluster ID, a BS ID, a posterior probability, latitude and longitude coordinates, and a label of a significant place are included in association with each other.

prior to the storage, the data subsets are sorted in a manner exemplified in FIG. 18, that the cluster IDs are arranged in groups, in an order in which the appearance numbers of the same cluster IDs are descending, and, within each cluster ID group which shares the same cluster ID, the corresponding BS IDs are arranged in posterior-probability-descending order.

In an alternative, the posterior probabilities may be replaced with the expected numbers with which each mobile phone 2 communicates with the base stations 3 per each cluster as illustrated in FIG. 15, in combination with a threshold.

[Application Processing Unit]

The application processing unit 17 may be configured to provide location based-services or applications to the users, based on the results of the significant-place estimator 15.

In an exemplary implementation where the significant-place storing unit 16 is configured to additionally store in the storage device, names of geographical areas within the associated base stations 3 (e.g., the names of the nearest train stations, the nearest subway stations, or the nearest landmarks), in association with some of the clusters which are assigned "staying (office/school or home)."

More specifically, in this implementation, where the base stations 3 are located as illustrated in FIG. 1, "FUJIMINO" station is selected to indicate the geographic name of an area nearest the user's home, and "IDABASHI" station is selected to indicate the geographic name of an area nearest the user's office/school, but "IKUBUKURO" station or "OTEMACHI" station is not selected.

In this implementation, even when there is a considerable difference between the centroid of a combined coverage area of a sub-set of the plurality of base stations 3 which are associated with a particular cluster, and the exact position of each user's home, the exact name of the geographic area within which each user's home is located can be selected.

As a result, this implementation allows each user's significant place to be estimated, based on physical locations of the base stations 3 and probabilities that each mobile phone 2 communicates with each base stations 3, with an adequately high spatial accuracy, despite that a time series of actual locations of the base stations 3 obtained at a coarse level of spatial granularity are used for the estimation.

An exemplary version of such a location-based service is personalized information service for offering sets of consumer-specific information such as coupon information to potential consumers.

In an exemplary implementation where the significant-place storing unit 16 additionally stores in the storage device, names of geographic areas within the associated base stations 3, in association with some of the clusters which are assigned "staying," the application processing unit 17 may be configured to use the geographic names for the purpose of, for example, providing location based-services or applications to the user.

As will be evident from the foregoing, the present embodiment allows each user's significant place to be estimated using a time series of actual locations of the base stations 3, which are obtained by the facilities of the telecommunication company at a coarse level of spatial granularity and at irregular time intervals, without activating a positioning function of each mobile phone 2.

Because the present embodiment does not require a positioning function such as a GPS or each mobile phone 2 which tends to consume a large amount of electrical power, on each mobile phone 2, the present embodiment eliminates each user's concern about increased energy consumption and shortened battery life of each mobile phone 2 for estimating each user's significant place.

In particular, when the significant-place estimation is performed in the SPED 1, which is run by the telecommunication company, the significant-place estimation does not require each mobile phone 2 to consume a large amount of electrical power for the estimation or to incorporate a special application for the significant-place estimation.

Further, in this arrangement, the SPED 1 can collect information of significant places of many users, which allowing, for example, estimation a collective or common activity pattern of users which is beneficial to, for example, product planners, advertisers (e.g., for behavioral advertising, targeted advertising), shoppers, etc.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for estimating significant places visited by users carrying respective mobile terminals for wireless communication via a plurality of base stations, the apparatus comprising:

a communication-log collector configured to collect, per each mobile terminal, at least one communication log represented with a plurality of consecutive communication events between each mobile terminal and a connected one of the base stations in a coverage area of each mobile terminal, by receiving the communication events from the connected base station, the plurality of base stations being identified by a plurality of unique base-station identifiers (BS IDs), respectively, each communication event including date and time of communication and one of the BS IDs which is indicative of the connected base station;

a time-window divider configured to divide each communication log into a plurality of consecutive time-windowed segments, using a discrete time window moving in time, each time-windowed segment including a sub-set of the plurality of communication events, each time-windowed segment represented by a single frequency vector having a plurality of elements allocated to the plurality of BS IDs, respectively, each element of the frequency vector having a value indicative of a frequency with which a corresponding one of the BS IDs appears in the sub-set of communication events belonging to a corresponding one of the plurality of time-windowed segments;

a clusterer configured to cluster a plurality of frequency vectors respectively corresponding to the plurality of time-windowed segments, such that a sub-plurality of frequency vectors are clustered together and incorporated into a same cluster, to generate a plurality of clusters, based on co-occurrence of the appeared BS IDs between the plurality of frequency vectors;

a stay determination unit configured to determine, per each cluster, whether each user is staying in a coverage area of at least specific one of the base stations, or moving, based on a probability distribution with which the plurality of BS IDs appear in a sub-set of some of the communication events that belong to each cluster; and a significant-place estimator configured to estimate that the coverage area is each user's significant place in life, if the stay determination unit determines that each user is staying in the coverage area, wherein the stay determination unit is further configured to determine, per each cluster, that each user is staying, if the probability distribution indicates that a smaller number of ones of the plurality of BS IDs, which are located in vicinity of an actual location of the mobile terminal, have appeared with a higher probability than those of other BS IDs, and that each user is moving, if the probability distribution indicates that a larger number of ones of the plurality of BS IDs have appeared with a higher probability than those of other BS IDs, and wherein the apparatus operates in a facility that is provided by a telecommunication company or a carrier to collectively manage the plurality of base stations, and that collects from the connected base stations a time series of sets of location data indicative of the actual locations of the connected base stations, at a coarse level of spatial granularity and at irregular time intervals, on a per-mobile-phone basis.

2. The apparatus according to claim 1, wherein
the clusterer is further configured to generate a plurality of clusters each of which includes a sub-set of the plurality of frequency vectors, based on values of distances between the frequency vectors each of which is measured by a distance metric.

3. The apparatus according to claim 1, wherein the clusterer is further configured to perform a topic-model-based estimation approach in which the plurality of time-windowed segments each of which is represented by the sub-set of communication events in each time-windowed segment are handled as a plurality of documents, respectively, the sub-set of BS IDs in each time-windowed segment are handled as a plurality of words of each document, respectively, and a plurality of latent topics of each document are estimated as a plurality of latent topics of the sub-set of communication events in each time-windowed segment, respectively, and is further configured to assign the plurality of latent topics to the plurality of clusters, to thereby assign the plurality of clusters to each time-windowed segment.

4. The apparatus according to claim 3, wherein the topic-model-based estimation approach includes one of LDA (Latent Dirichlet Allocation), and HDP (Hierarchical Dirichlet Process)-LDA (Latent Dirichlet Allocation).

5. The apparatus according to claim 1, wherein the stay determination unit is further configured to determine, per each cluster, that each user is staying, if an entropy value of each time-windowed segment is lower than a threshold, the entropy value indicating randomness with which the plurality of BS IDs appear in the sub-set of communication events.

6. The apparatus according to claim 1, wherein some of the plurality of communication events that belong to each cluster are denoted as a plurality of vectors, respectively, each vector having a plurality of elements allocated to the plurality of BS IDs, each element of each vector having a value indicative of a frequency with which a corresponding one of the BS IDs appears in each communication event, and the stay determination unit is further configured to determine, per each cluster, that each user is staying, if a variance on a 2-dimensional space where at least one of the plurality of BS IDs which appear in a sub-set of the communication events that belong to a cluster are mapped correspondent to geographical locations of the base stations, is smaller than a threshold.

7. The apparatus according to claim 1, wherein the communication-log collector is further configured to collect the communication log for an observation period spanning a plurality of days, and the significant-place estimator is further configured to
measure, per each cluster, a characteristic which corresponding ones of the communication events belonging to each cluster exhibit on working days in the observation period, and a characteristic which the corresponding communication events exhibit on non-working days in the observation period, based on the collected communication log, to assign one of the clusters to each user's home, and one of remaining ones of the clusters to each user's office/school, based on the measured characteristics, and to determine, each time-windowed segment, that each user's home is within each user's significant place, if the assigned one cluster is assigned to each user's home, and each user's office/school is within each user's significant place, if the assigned one cluster is assigned to each user's office/school.

8. The apparatus according to claim 7, wherein each cluster includes at least one or the communication events, each communication event corresponds to one of the plurality of BS IDs, and the significant-place estimator is further configured to calculate at least two of: D which indicates a frequency with which the plurality of BS IDs appear in one of the communication events that belongs to any one of the clusters in the observation period; Dw which indicates a frequency with which the plurality of BS IDs appear in one of the communication events that belongs to any one of the clusters on working days in the observation period; and Dh which indicates a frequency with which the plurality of BS IDs appear in one of the communication events that belongs to any one of the clusters on non-working days in the observation period, based on the communication events, to calculate, per each cluster x, at least two of: nd(x) which indicates a frequency with which the plurality of BS IDs appear in one of the communication events that belongs to each cluster x in the observation period; ndw(x) which indicates a frequency with which the plurality of BS IDs appear in one of the communication events that belongs to each cluster x on working days in the observation period; and ndh(x) which indicates a frequency with which the plurality of BS IDs appear in one of the communication events that belongs to each cluster x on non-working days in the observation period, based on the communication events, and to assign one of the clusters to each user's home, and one of the remaining ones of the clusters to each user's office/school, such that one of the clusters which has a maximum nd(x)/D is assigned each user's home, and one of the remaining clusters which has a maximum ndw(x)/Dw is assigned each user's office/school, or such that, after selecting two of the clusters each of which has nd(x)/D larger than those of any other clusters, one of the selected two clusters which has ndw(x)/Dw larger than the other one of the selected two clusters is assigned each user's office/school, and the other one of the selected two clusters is assigned each user's home, or such that, after selecting two of the clusters each of which has nd(x)/D larger than those of any other clusters, one of the selected two clusters which has ndh(x)/Dh larger than the other one of the selected two clusters is assigned each user's home, and the other one of the selected two clusters is assigned each user's office/school.

9. The apparatus according to claim 1, wherein each mobile terminal includes a mobile phone, the apparatus is communicatively coupled with the plurality of base stations via a mobile phone communication network, and the apparatus is disposed as a facility of a carrier of the mobile phone communication network.

10. The apparatus according to claim 1, wherein the stay determination unit is further configured to determine that a current one of the plurality of time-windowed segments indicates each user's staying and moving serially combined in the description order, if a previous one of the plurality of time-windowed segments indicates each user's staying and the current time-windowed segment indicates at least each user's moving, and to determine that the current time-windowed segment indicates each user's moving and staying serially combined in the description order, if the previous time-windowed segment indicates each user's moving and the current time-windowed segment indicates at least each user's staying.

11. The apparatus according to claim 1, wherein the time-window divider is further configured to move the time window with time such that a new time-windowed segment partially overlaps with an immediately-old time-windowed segment, thereby dividing each communication log into the plurality of consecutive time-windowed segments.

12. A method of estimating significant places visited by users carrying respective mobile terminals for wireless communication via a plurality of base stations, the method comprising:

per each mobile terminal, collecting at least one communication log represented with a plurality of consecutive communication events between each mobile terminal and a connected one of the base stations in a coverage area of each mobile terminal, by receiving the communication events from the connected base station, the plurality of base stations being identified by a plurality of unique base-station identifiers (BS IDs), respectively, each communication event including date and time of communication and one of the BS IDs which is indicative of the connected base station;

dividing each communication log into a plurality of consecutive time-windowed segments, using a discrete time window moving in time, each time-windowed segment including a sub-set of the plurality of communication events, each time-windowed segment represented by a single frequency vector having a plurality of elements allocated to the plurality of BS IDs, respectively, each element of the frequency vector having a value indicative of a frequency with which a corresponding one of the BS IDs appears in the sub-set of communication events belonging to a corresponding one of the plurality of time-windowed segments;

clustering a plurality of frequency vectors respectively corresponding to the plurality of time-windowed segments, such that a sub-plurality of frequency vectors are clustered together and incorporated into a same cluster, to generate a plurality of clusters, based on co-occurrence of the appeared BS IDs between the plurality of frequency vectors;

per each cluster, determining whether each user is staying in a coverage area of at least specific one of the base stations, or moving, based on a probability distribution with which the plurality of BS IDs appear in a sub-set of some of the communication events that belong to each cluster; and per each time-windowed segment, estimating that the coverage area is each user's significant place in life, if the stay determination unit determines that each user is staying in the coverage area, wherein the determining operation includes determining, per each cluster, that each user is staying, if the probability distribution indicates that a smaller number of ones of the plurality of BS IDs, which are located in vicinity of an actual location of the mobile terminal, have appeared with a higher probability than those of other BS IDs, and that each user is moving, if the probability distribution indicates that a larger number of ones of the plurality of BS IDs have appeared with a higher probability than those of other BS IDs, and wherein the method is performed in a facility that is provided by a telecommunication company or a carrier to collectively manage the plurality of base stations, and that collects from the connected base stations a time series of sets of location data indicative of the actual locations of the connected base stations, at a coarse level of spatial granularity and at irregular time intervals, on a per-mobile-phone basis.

13. The method according to claim 12, wherein the dividing operation includes moving the time window with time such that a new time-windowed segment partially overlaps with an immediately-old time-windowed segment, thereby dividing each communication log into the plurality of consecutive time-windowed segments.

* * * * *